(12) United States Patent
Huang (10) Patent No.: US 9,391,766 B2
(45) Date of Patent: Jul. 12, 2016

(54) GLOBAL SYNCHRONIZATION METHOD AND SYSTEM BASED ON PACKET SWITCHING SYSTEM

(75) Inventor: Wei Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 140 days.

(21) Appl. No.: 14/369,332

(22) PCT Filed: Dec. 27, 2011

(86) PCT No.: PCT/CN2011/084738
§ 371 (c)(1),
(2), (4) Date: Jun. 27, 2014

(87) PCT Pub. No.: WO2013/097092
PCT Pub. Date: Jul. 4, 2013

(65) Prior Publication Data
US 2015/0010022 A1    Jan. 8, 2015

(51) Int. Cl.
*H04J 3/06* (2006.01)
*H04L 7/00* (2006.01)
*H04L 12/931* (2013.01)

(52) U.S. Cl.
CPC .............. *H04L 7/0016* (2013.01); *H04J 3/0658* (2013.01); *H04L 49/40* (2013.01)

(58) Field of Classification Search
CPC ....... H04L 7/0016; H04L 49/40; H04L 49/20; H04L 2463/121; H04J 3/0658; G06F 1/12; G06F 1/04; G06F 11/1604
See application file for complete search history.

(56) References Cited

U.S. PATENT DOCUMENTS

| | | | | |
|---|---|---|---|---|
| 6,973,090 B2 * | 12/2005 | Ofek | ................... | H04L 12/6418 370/389 |
| 7,002,996 B1 | 2/2006 | Dougherty et al. | | |
| 7,012,917 B2 * | 3/2006 | Brolin | ................... | H04J 3/0688 370/352 |
| 7,742,505 B2 * | 6/2010 | Venters | ................. | H04J 3/0685 370/395.62 |
| 7,791,394 B2 * | 9/2010 | Schmid | ..................... | G06F 1/04 327/292 |
| 8,867,681 B2 * | 10/2014 | Yoshida | .................... | G06F 1/12 327/141 |
| 8,868,960 B2 * | 10/2014 | Bergmann | ................ | G06F 1/12 713/375 |

(Continued)

FOREIGN PATENT DOCUMENTS

| | | |
|---|---|---|
| CN | 101562490 A | 10/2009 |
| CN | 101674645 A | 3/2010 |
| CN | 101931585 A | 12/2010 |

OTHER PUBLICATIONS

Supplementary European Search Report in European application No. 11878817.3, mailed on Jul. 13, 2015.

(Continued)

*Primary Examiner* — Brian O'Connor
(74) *Attorney, Agent, or Firm* — Oppedahl Patent Law Firm LLC (57) ABSTRACT

A global synchronization method based on a packet switching system includes that: a reference chip is selected; and each chip calibrates its own timer by taking the reference chip as a reference, wherein each chip sends a zero-point pulse or zero-point pulse cell to each high-speed link (serdes) connected with the chip, and feeds back a calibration cell in response to a zero-point pulse or zero-point pulse cell received through each high-speed link. Accordingly, a global synchronization system based on a packet switching system is also disclosed. The disclosure reduces the packet loss rate and increases the accuracy of calibration.

18 Claims, 9 Drawing Sheets

(56) References Cited

U.S. PATENT DOCUMENTS

| | | | |
|---|---|---|---|
| 2002/0018475 A1* | 2/2002 | Ofek | H04L 12/6418 370/400 |
| 2009/0102534 A1* | 4/2009 | Schmid | G06F 11/1604 327/292 |
| 2011/0191619 A1 | 8/2011 | Morrison et al. | |
| 2014/0015585 A1* | 1/2014 | Papaefthymiou | G06F 1/10 327/291 |

OTHER PUBLICATIONS

International Search Report in international application No. PCT/CN2011/084738, mailed on Jul. 5, 2012.

English Translation of the Written Opinion of the International Search Authority in international application No. PCT/CN2011/084738, mailed on Jul. 5, 2012.

* cited by examiner

GLOBAL SYNCHRONIZATION METHOD AND SYSTEM BASED ON PACKET SWITCHING SYSTEM

TECHNICAL FIELD

The disclosure relates to the field of packet switching, and in particular to a global synchronization method and system based on a packet switching system.

BACKGROUND

Figure 1:
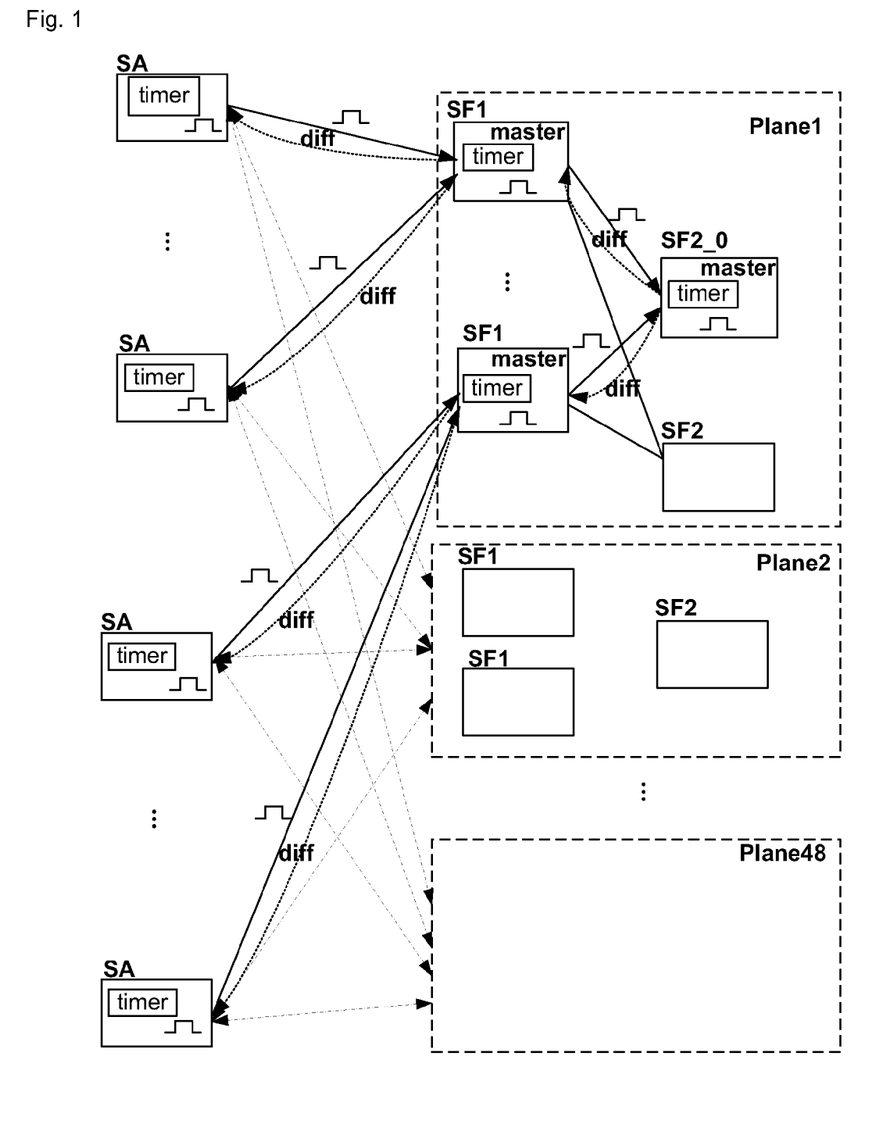
FIG. 1 is a schematic diagram illustrating a structure of a global synchronization network according to an embodiment.

A packet switching device consists of Switch Access (SA) chips and Switch Fabric (SF) chips on a line card. In a high-capacity packet switching system, switching chips consist of two levels of chips: upper-level SF2 chips and lower-level SF1 chips, and in an intermediate-capacity or low-capacity switching system, switching chips merely consist of SA chips and SF2 chips. FIG. 1 shows the structure of a global synchronization network. In a distributed packet switching device, all line cards need to be synchronized in timestamp counting, so as to ensure that data packets simultaneously sent from all line cards have the same timestamp so that the data packets can be recombined at the position of a downstream destination line card.

In an existing global synchronization method, a reference is basically selected in a software-designated manner in which each chip in a packet switching system reports its own state and the state of a serdes link to a uniform network manager, the network manager conducts an operation to determine which chip should be designated as a reference, and thereby conducts a calculation to determine which link each chip should select as a calibration source, and then successively configures the commands in each chip in this system. The foregoing processes need to be carried out again when any link or chip in the system malfunctions. The foregoing calculation method is complicated and the state collection and command issuing process is long, especially when there are thousands of chips in a large-scale packet switching system. It takes a very long time to reselect a new reference when a link or chip in the system malfunctions, which may lead to the loss of a packet in the system or congestion resulting from out of alignment of time.

In contrast, since the reselection and synchronization of a reference can be completed in a short time for the separate operation of each chip, the disclosure based on a pure-hardware operation greatly reduces the possibility of occurrence of packet loss or congestion when a link or chip in a system malfunctions.

SUMMARY

In view of this, the disclosure provides a global synchronization method and system based on a packet switching system, so as to reduce packet loss rate and improve the accuracy of calibration.

To this end, a technical solution of the disclosure is implemented as follows.

A global synchronization method based on a packet switching system includes:
a reference chip is selected; and
each chip calibrates its own timer by taking the reference chip as a reference;
The selected reference chip may be a reference chip elected by all chips, or a reference chip designated by a Central Processing Unit (CPU).

The method may further include that: each chip sends a zero-point pulse or zero-point pulse cell to each high-speed link serdes connected with the chip, and feeds back a calibration cell in response to a zero-point pulse or zero-point pulse cell received through each high-speed link serdes.

The step that each chip calibrates its own timer by taking the reference chip as a reference may include that: the chip calibrates its own timer by using the received zero-point pulse or zero-point pulse cell when the chip is calibrated by a lower-level chip, or the chip calibrates its own timer by using a difference value in the received calibration cell when the chip is calibrated by a higher-level chip or a same level chip, wherein an SF1 chip has a level lower than that of an SF2 chip and higher than that of an SA chip.

When the reference chip is an SF2 chip or an SA chip, the process that each SF2 chip calibrates its own timer by taking the reference chip as a reference may include that:
an initial value of the reference chip of the SF2 chip is set as a maximum invalid value;
after all effective links connected with the SF2 chip receive a calibration cell, the SF2 chip compares C_SF2_IDs in all calibration cells received, wherein each of the C_SF2_IDs represents an SF2 chip from which a timing reference of the SF2 chip comes;
when all the C_SF2_IDs are greater than its own Identify (ID) of the SF2 chip, the SF2 chip determines that the SF2 chip is a reference clock, and the SF2 chip carries out no calibration on its own timer;
when its own ID of the SF2 chip is not minimum, the SF2 chip selects a link to which a minimum C_SF2_ID of the received C_SF2_IDs corresponds, to calibrate its own timer; and
when its own ID of the SF2 chip is not minimum and a minimum C_SF2_ID is received through a plurality of links in the all effective links, the SF2 chip selects, from the plurality of links, a link an opposite terminal chip of which has a minimum SRC_ID to calibrate its own timer.

The method may further include that: the SF2 chip sends a calibration cell to each high-speed link serdes, wherein a P_SF2_ID in the calibration cell is filled with the ID of the SF2 chip and the calibration cell includes a measured difference value Diff_t.

When the reference chip is an SF2 chip or SA chip, the process that each SF1 chip calibrates its own timer by taking the reference chip as a reference may include that:
an initial value of the reference chip of the SF1 chip is set as a maximum invalid value;
after all effective links connected with the SF1 chip receive a calibration cell, the SF1 chip compares the received calibration cells;
when a P_SF2_ID or C_SF2_ID of the calibration cell on a link in the all effective links is minimum, the SF1 chip selects the link to calibrate its own timer, wherein the P_SF2_ID represents an SF2 chip which is directly connected with the SF1 chip through a physical link and has a minimum ID, and the C_SF2_ID represents an SF2 chip from which a timing reference of the SF1 chip comes;
when a minimum P_SF2_ID or C_SF2_ID is received through a plurality of links in the all effective links and the plurality of links have different types of opposite terminal chips, the SF1 chip selects, from the plurality of links, a link an opposite terminal chip of which is an SF2 chip to calibrate its own timer; and
when a minimum P_SF2_ID or C_SF2_ID is received through a plurality of links in the all effective links and the plurality of links no link in the plurality of links has an opposite terminal SF2 chip, the SF1 chip selects a link an opposite terminal chip of which has a minimum SRC_ID to calibrate its own timer.

The method may further include that: after the SF1 chip determines its own reference chip, the SF1 chip fills the P_SF2_ID or C_SF2_ID of the reference chip into a C_SF2_ID field, sends the C_SF2_ID field to all SF2 chips connected with the SF1 chip, fills the SF2 chip physically connected with the SF1 chip and having the minimum ID into a P_SF2_ID field, and sends the P_SF2_ID field to all SA chips connected with the SF1 chip; and when the SF1 chip is disconnected with all SF2 chips connected with the SF1 chip, the SF1 chip fills the maximum invalid value into the P_SF2_ID field.

When the reference chip is an SF2 chip or SA chip, the process that each SA chip calibrates its own timer by taking the reference chip as a reference may include that:

an initial value of the reference chip of the SA chip is set as a maximum invalid value;

after all effective links connected with the SA chip receive a calibration cell, the SA chip compares the received calibration cells;

when an opposite terminal chip of the SA chip is an SF1 chip or SF2 chip, the SA chip compares P_SF2_IDs in the received calibration cells, selects a link corresponding to a minimum P_SF2_ID to calibrate its own timer, and records the minimum P_SF2_ID as a reference chip of the SA chip after the calibration;

when an opposite terminal chip of the SA chip is an SF1 chip or SF2 chip and a minimum P_SF2_ID is received through a plurality of links in the all effective links, the SA chip selects, from the plurality of links, a link an opposite terminal chip of which has a minimum SRC_ID to calibrate its own timer, and records the minimum P_SF2_ID as the reference chip of the SA chip after the calibration; and when an opposite terminal chip of the SA chip is an SA chip, the SA chip compares all received SRC_IDs, uses a minimum SRC_ID as a reference to calibrate its own timer, and records the minimum SRC_ID as its own reference chip after the calibration; and when the received minimum SRC_ID is greater than an ID of the SA chip, the SA chip determines that the SA chip is a reference clock, and the SA chip carries out no calibration on its own timer.

The method may further include that: after the SA chip determines its own reference chip, the SA chip fills the P_SF2_ID or SRC_ID of the reference chip into a C_SF2_ID field, measures a difference value Diff_Time, and sends a calibration cell including the difference value Diff_Time to each high-speed link serdes connected with the SA chip.

A global synchronization system based on a packet switching system includes a reference chip and at least one another chip which calibrates its own timer by taking the reference chip as a reference.

The reference chip may be elected by all chips or designated by a CPU.

Each chip may be further configured to send a zero-point pulse or zero-point pulse cell to each high-speed link serdes connected with the chip, and feed back a calibration cell in response to a zero-point pulse cell or zero-point pulse cell received through each high-speed link serdes connected with the chip.

Each chip may be configured to: calibrate its own timer by using the received zero-point pulse or zero-point pulse cell when the chip is calibrated by a lower-level chip, or calibrate its own timer by using a difference value in the received calibration cell when the chip is calibrated by a higher-level chip or a same level chip, wherein a Switch Fabric level 1 (SF1) chip has a level lower than that of a Switch Fabric level 2 (SF2) chip and higher than that of a Switch Access (SA) chip.

When the reference chip is an SF2 chip or SA chip, each SF2 chip may be configured to:

set an initial value of the reference chip of the SF2 chip as a maximum invalid value;

after all effective links connected with the SF2 chip receive a calibration cell, compare C_SF2_IDs in all calibration cells received, wherein each of the C_SF2_IDs represents an SF2 chip from which a timing reference of the SF2 chip comes;

when all the C_SF2_IDs are greater than its own Identify (ID) of the SF2 chip, determine that the SF2 chip is a reference clock, and carry out no calibration on its own timer;

when its own ID of the SF2 chip is not minimum, select a link to which a minimum C_SF2_ID of the received C_SF2_IDs corresponds, to calibrate its own timer; and when its own ID of the SF2 chip is not minimum and a minimum C_SF2_ID is received through a plurality of links in the all effective links, select, from the plurality of links, a link an opposite terminal chip of which has a minimum SRC_ID to calibrate its own timer.

The SF2 chip may be further configured to send a calibration cell to each high-speed link serdes, wherein a P_SF2_ID in the calibration cell is filled with the ID of the SF2 chip and the calibration cell includes a measured difference value Diff_t.

When the reference chip is an SF2 chip or SA chip, each SF1 chip may be configured to:

set an initial value of the reference chip of the SF1 chip as a maximum invalid value;

after all effective links connected with the SF1 chip receive a calibration cell, compare the received calibration cells;

when a P_SF2_ID or C_SF2_ID of the calibration cell on a link in the all effective links is minimum, select the link to calibrate its own timer, wherein the P_SF2_ID represents an SF2 chip which is directly connected with the SF1 chip through a physical link and has a minimum ID, and the C_SF2_ID represents an SF2 chip from which a timing reference of the SF1 chip comes;

when a minimum P_SF2_ID or C_SF2_ID is received through a plurality of links in the all effective links and the plurality of links have different types of opposite terminal chips, select, from the plurality of links, a link an opposite terminal chip of which is an SF2 chip to calibrate its own timer; and when a minimum P_SF2_ID or C_SF2_ID is received through a plurality of links in the all effective links and the plurality of links no link in the plurality of links has an opposite terminal SF2 chip, select a link an opposite terminal chip of which has a minimum SRC_ID to calibrate its own timer.

The SF1 chip may be further configured to: after the SF1 chip determines its own reference chip, fill the P_SF2_ID or C_SF2_ID of the reference chip into a C_SF2_ID field, send the C_SF2_ID field to all SF2 chips connected with the SF1 chip, fill the SF2 chip physically connected with the SF1 chip and having the minimum ID into a P_SF2_ID field, and send the P_SF2_ID field to all SA chips connected with the SF1 chip; and when the SF1 chip is disconnected with all SF2 chips connected with the SF1 chip, fill the maximum invalid value into the P_SF2_ID field.

When the reference chip is an SF2 chip or SA chip, each SA chip may be configured to:

set an initial value of the reference chip of the SA chip as a maximum invalid value;

after all effective links connected with the SA chip receive a calibration cell, compare the received calibration cells;

when an opposite terminal chip of the SA chip is an SF1 chip or SF2 chip, compare P_SF2_IDs in the received calibration cells, select a link corresponding to a minimum P_SF2_ID to calibrate its own timer, and record the minimum P_SF2_ID as a reference chip of the SA chip after the calibration;

when an opposite terminal chip of the SA chip is an SF1 chip or SF2 chip and a minimum P_SF2_ID is received through a plurality of links in the all effective links, select, from the plurality of links, a link an opposite terminal chip of which has a minimum SRC_ID to calibrate its own timer, and record the minimum P_SF2_ID as the reference chip of the SA chip after the calibration; and when an opposite terminal chip of the SA chip is an SA chip, compare all received SRC_IDs, use a minimum SRC_ID as a reference to calibrate its own timer, and record the minimum SRC_ID as its own reference chip after the calibration; and when the received minimum SRC_ID is greater than an ID of the SA chip, determine that the SA chip is a reference clock, and carry out no calibration on its own timer.

The SA chip may be further configured to: after the SA chip determines its own reference chip, fill the P_SF2_ID or C_SF2_ID the reference chip into a C_SF2_ID field, measure a difference value Diff_Time, and send a calibration cell including the difference value Diff_Time to each high-speed link serdes connected with the SA chip.

According to the global synchronization method and system based on a packet switching system disclosed herein, a reference chip is selected, and each chip calibrates its own timer by taking the reference chip as a reference, wherein each chip sends a zero-point pulse or zero-point pulse cell to each high-speed link serdes connected with the chip, and feeds back a calibration cell in response to a zero-point pulse or zero-point pulse cell received through each high-speed link connected with the chip. Through the present disclosure, a new reference chip or reference link can be selected quickly when a reference chip or a high-speed link serdes connected (directly or indirectly) with a reference chip malfunctions, thus reducing the packet loss rate. Moreover, when calibrated by a lower-level chip, a higher-level chip is calibrated by using a received zero-point pulse or zero-point pulse cell, thus increasing the accuracy of the calibration.

DETAILED DESCRIPTION

The basic concept of the disclosure lies in that: a reference chip is selected, and each chip calibrates its own timer by taking the reference chip as a reference, wherein each chip sends a zero-point pulse or zero-point pulse cell to each high-speed link serdes connected with the chip, and feeds back a calibration cell in response to a zero-point pulse or zero-point pulse cell received through each high-speed link serdes connected with the chip.

Figure 2:
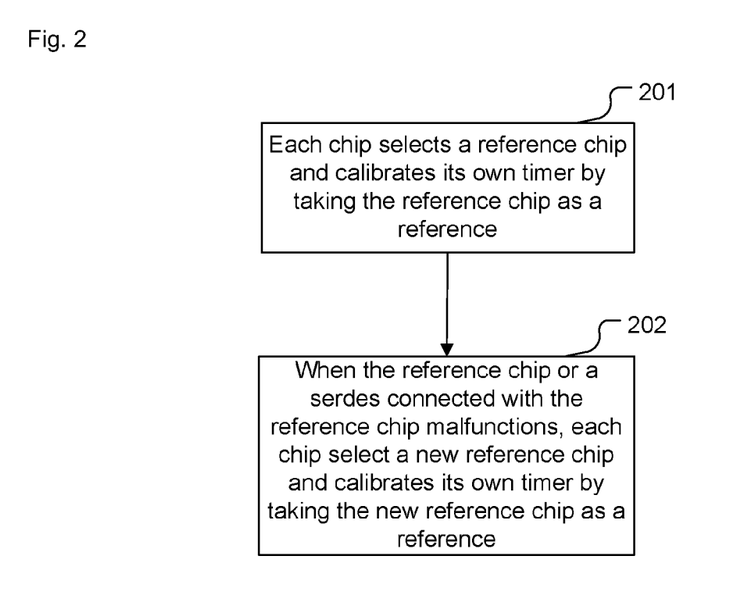
FIG. 2 is a flowchart schematically illustrating a global synchronization method based on a packet switching system according to the disclosure.

FIG. 2 is a flowchart schematically illustrating a global synchronization method based on a packet switching system according to the disclosure. As shown in FIG. 2, the method includes:

Step 201: A reference chip is selected.

Here, the selected reference chip may be a reference chip elected by all chips, or a reference chip designated by a CPU.

Step 202: Each chip calibrates its own timer by taking the reference chip as a reference.

It needs to be noted that a new reference chip needs to be selected when the reference chip or a high-speed link serdes connected with the reference chip malfunctions, and each chip calibrates its own timer by taking the new reference chip as a reference.

Typically, since chips which finally need to be calibrated are SA chips, but SF2 chips are highest in level and the paths from SF2 chips to SA chips are substantially equal with respect to those from SF1 chips and SA to the SA, an SF2 should be elected as a reference.

Each chip separately acquires the connection condition of surrounding chips, automatically elects, upon determination, a reference chip and calibrates its own timer by taking the elected reference chip as a reference. If a chip is directly connected with the reference chip, then the chip may calibrate its own timer according to the reference chip. If a chip is connected with the reference chip through multi-hops, then chip is not calibrated until all chips on the connection path are successively calibrated.

Generally, a timer is arranged for each SA chip and each SF chip in a system, and any single SF2 in the system is selected as a reference (e.g., an SF2 the ID of which is equal to 0). Each SF1 chip sends a pulse signal or cell (i.e., a zero-point pulse or zero-point pulse cell) through a high-speed link serdes immediately when the timer reaches 0. After receiving the pulse signal or cell, each SF2 chip compares the received pulse signal or cell with the zero time point of the SF2 chip to obtain a difference value, then feeds back the different value to the SF1 chip through a specific calibration cell at any following moment, and gives the lower-level SF1 chip authority to adjust the timer of the SA chip. The SF1 chip adjusts its own timer according to the difference value to be consistent with the master SF2 chip, and the timing error between each two SF1 chips is the time difference of the two SF1 chips in the transfer of a timing pulse through a high-speed link serdes.

Sequentially, the SA chip sends a zero-point pulse or zero-point pulse cell of the SA to SF1 chips connected with the SA chip. After receiving the zero-point pulse or zero-point pulse cell of the SA, the one of the SF1 chips which has adjustment authority compares the received zero-point pulse or zero-point pulse cell with the zero time point of the SF1 chip to obtain a difference value, and then informs each SA chip connected with the SF1 chip of the difference value through a calibration cell, so that each SA chip can adjust its own timer according to the difference value, thereby implementing the substantial synchronization of all SA chips on the network. For example, in FIG. 1, the first SF2 chip (SF2_0) of the plane 1 is selected as a reference, and after being aligned with the first SF2 chip, each SF1 chip connected with the first SF2 calibrates SA chips connected with the SF1.

In the case of a single-level switching, the SF2 the ID of which is equal to 0 only needs to be selected as a master timer to directly calibrate SA chips.

Since it is required that an SA chip or SF1 chip sends a pulse to a master timer immediately when the timer of the SA chip or SF1 chip reaches zero, the pulse must be assigned with the highest priority to interrupt other cells being sent. It may be considered that a specific control field is added in 8 B/10 B encoding to transmit the pulse and the reference SF chip feeds back a timing difference value via a specific calibration cell. Thus, it is needed to separately define a control cell. Since the zero-point pulse only needs to go through 8 B/10 B encoding, a high-speed link serdes and 8 B/10 B decoding, the delay of the zero-point pulse is too small to generate a great influence. Furthermore, instead of carrying out 8 B/10 B encoding on the timing pulse, a message cell may also be sent at the zero time to inform an opposite terminal chip. However, the accuracy achieved in this case is lower than that achieved in the use of 8 B/10 B encoding. For example, a zero pulse cell may be used if a relatively large error is allowable, since the zero pulse cell incapable of interrupting a cell being sent can only be sent after the current cell is sent, the generated error is at most a cell time. When the elected reference chip is pulled out or a high-speed link serdes is disconnected, a new reference clock needs to be found and the synchronization needs to be carried out again. In this case, the new reference clock should be substantially consistent with the original reference clock, so as to avoid a great change in a timestamp value.

The following concepts are defined in the disclosure:

SRC_LVL: including three modes (destination_level) of SA, SF2 and SF1, which are defined as follows:

SRC_ID: representing the ID of the current chip, wherein each of SA, SF2 and SF1 chips has a separate SRC_ID; and C/P_SF2_ID: C_SF2_ID represents the SF2 chip from which the timing reference of the current chip comes, P_SF2_ID represents the SF2 chip which is directly connected with the current chip through a physical link and has a minimum ID. The calibration cell sent from an SA chip merely uses C_SF2_ID, an SF2 chip merely uses P_SF2_ID, and P_SF2_ID is sent from an SF1 chip to an SA chip, and C_SF2_ID is sent from an SF1 chip to an SF2 chip.

In the disclosure, in order to prevent the occurrence of an unforeseen situation, the actions of chips are agreed as follows:

each chip sends a zero-point pulse or zero-point pulse cell to each high-speed link serdes connected with the chip, and feeds back a calibration cell in response to a zero-point pulse or zero-point pulse cell received through each high-speed link connected with the chip; a higher-level chip calibrates its own timer by using a received zero-point pulse or zero-point pulse cell when the higher-level chip calibrated by a lower-level chip, or the chip calibrates its own timer by using a difference value in the received calibration cell when the chip is calibrated by a higher-level chip or a same level chip (only appearing in a Mesh architecture), wherein an SF1 chip has a level lower than that of an SF2 chip and higher than that of an SA chip.

When the reference chip is an SF2 chip or an SA chip, the actions of an SF2 chip are specifically agreed as follows:

an initial value of the reference chip of the SF2 chip is set as a maximum invalid value;

after all effective links connected with the SF2 chip receive a calibration cell, the SF2 chip compares C_SF2_IDs in all calibration cells received, wherein each of the C_SF2_IDs represents an SF2 chip from which a timing reference of the SF2 chip comes;

when all the C_SF2_IDs are greater than its own Identify (ID) of the SF2 chip, the SF2 chip determines that the SF2 chip is a reference clock, and the SF2 chip carries out no calibration on its own timer;

when its own ID of the SF2 chip is not minimum, the SF2 chip selects a link to which a minimum C_SF2_ID of the received C_SF2_IDs corresponds, to calibrate its own timer;

when its own ID of the SF2 chip is not minimum and a minimum C_SF2_ID is received through a plurality of links in the all effective links, the SF2 chip selects, from the plurality of links, a link an opposite terminal chip of which has a minimum SRC_ID to calibrate its own timer; and the SF2 chip sends a calibration cell to each high-speed link serdes, wherein a P_SF2_ID in the calibration cell is filled with the ID of the SF2 chip and the calibration cell includes a measured difference value Diff_t, in other words, when issuing a calibration cell, the SF2 chip fills the P_SF2_ID with the ID of the SF2 chip, measures a difference value Diff_t, and sends the calibration cell including the difference value Diff_t to each high-speed link serdes.

When the reference chip is an SF2 chip or SA chip, the actions of an SF1 chip are agreed as follows:

an initial value of the reference chip of the SF1 chip is set as a maximum invalid value;

after all effective links connected with the SF1 chip receive a calibration cell, the SF1 chip compares the received calibration cells;

when a P_SF2_ID or C_SF2_ID of the calibration cell on a link in the all effective links is minimum, the SF1 chip selects the link to calibrate its own timer;

when a minimum P_SF2_ID or C_SF2_ID is received through a plurality of links in the all effective links and the plurality of links have different types (SA or SF2) of opposite terminal chips, the SF1 chip selects, from the plurality of links, a link an opposite terminal chip of which is an SF2 chip to calibrate its own timer (if there are a plurality of links an opposite terminal chip of which is an SF2 chip, then the SF1 chip selects the link corresponding to the minimum ID);

when a minimum P_SF2_ID or C_SF2_ID is received through a plurality of links in the all effective links and the plurality of links no link in the plurality of links has an opposite terminal SF2 chip, the SF1 chip selects a link an opposite terminal chip of which has a minimum SRC_ID to calibrate its own timer; and after the SF1 chip determines its own reference chip (from the received P_SF2_ID or C_SF2_ID), the SF1 chip fills the P_SF2_ID or C_SF2_ID of the reference chip into a C_SF2_ID field, sends the C_SF2_ID field to all SF2 chips connected with the SF1 chip, fills the SF2 chip physically connected with the SF1 chip and having the minimum ID into a P_SF2_ID field, and sends the P_SF2_ID field to all SA chips connected with the SF1 chip; and when the SF1 chip is disconnected with all SF2 chips connected with the SF1 chip, the SF1 chip fills the maximum invalid value into the P_SF2_ID field.

When the reference chip is an SF2 chip or SA chip, the actions of an SA chip are specifically agreed as follows:

an initial value of the reference chip of the SA chip is set as a maximum invalid value;

after all effective links connected with the SA chip receive a calibration cell, the SA chip compares the received calibration cells;

when an opposite terminal chip of the SA chip is an SF1 chip or SF2 chip, the SA chip compares P_SF2_IDs in the received calibration cells, selects a link corresponding to a minimum P_SF2_ID to calibrate its own timer, and records the minimum P_SF2_ID as a reference chip of the SA chip after the calibration;

when an opposite terminal chip of the SA chip is an SF1 chip or SF2 chip and a minimum P_SF2_ID is received through a plurality of links in the all effective links, the SA chip selects, from the plurality of links, a link an opposite terminal chip of which has a minimum SRC_ID to calibrate its own timer, and records the minimum P_SF2_ID as the reference chip of the SA chip after the calibration;

when an opposite terminal chip of the SA chip is an SA chip, the SA chip compares all received SRC_IDs, uses a minimum SRC_ID as a reference to calibrate its own timer, and records the minimum SRC_ID as its own reference chip after the calibration; and when the received minimum SRC_ID is greater than an ID of the SA chip, the SA chip determines that the SA chip is a reference clock, and the SA chip carries out no calibration on its own timer; and after the SA chip determines its own reference chip, the SA chip fills the P_SF2_ID or SRC_ID of the reference chip into a C_SF2_ID field, measures a difference value Diff_Time, and sends a calibration cell including the difference value Diff_Time to each high-speed link serdes connected with the SA chip.

It needs to be noted that for SA, SF1 and SF2 chips, when compared, if the P_SF2_IDs or C_SF2_IDs of the opposite terminals of a plurality of links are the same and the SRC_LVL and the SRC_IDs of the opposite terminals are also the same, then it means that the plurality of links are connected with the same chip, in this case, according to the ID of each link, the link having the minimum ID is selected for the calibration.

The foregoing mechanism, after being established, can cope with various abnormal changes of the system, so as to enable the system to quickly select a new reference clock and to synchronize all SA chips to the new reference.

Figure 3:
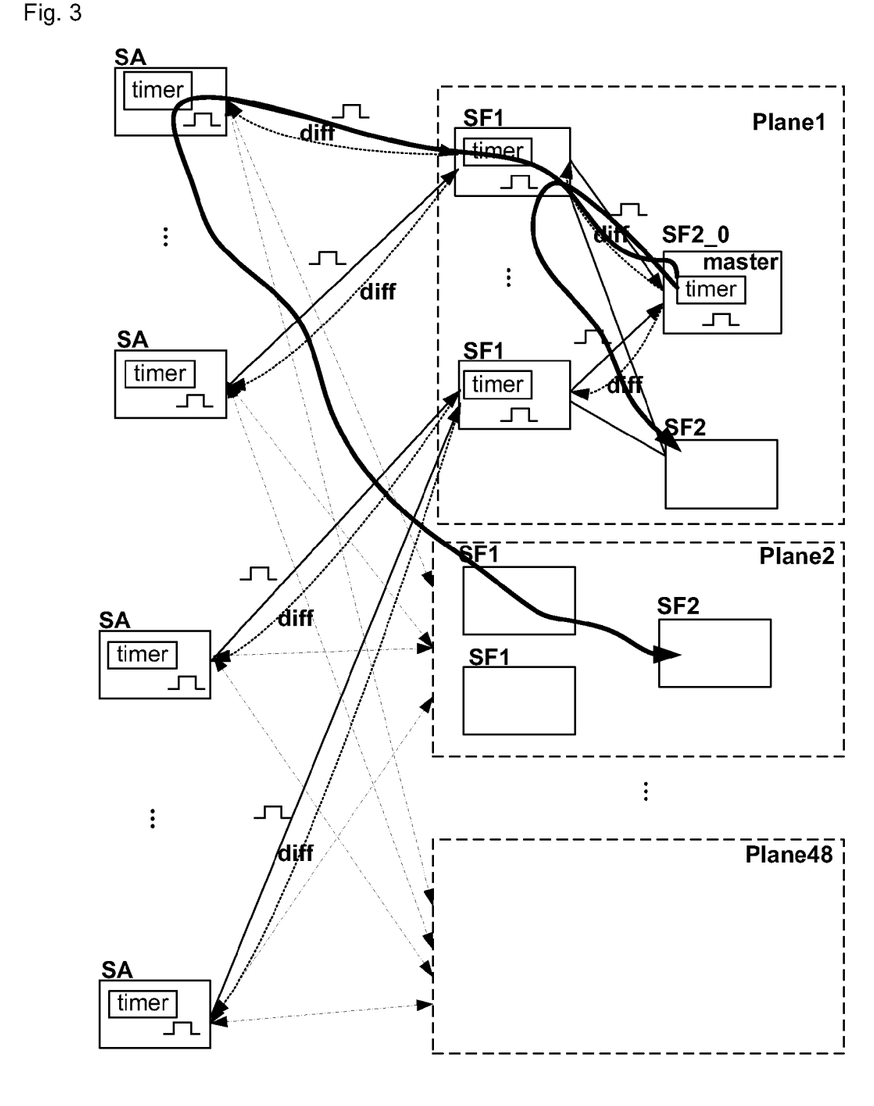
FIG. 3 is a schematic diagram illustrating a clock reference diffusion path when a system works normally.

When a system works normally, after a clock reference is established, the clock reference is gradually diffused to all SA chips and SF chips in the whole system. By taking FIG. 1 for an example, the diffusion path is shown in FIG. 3.

Figure 4:
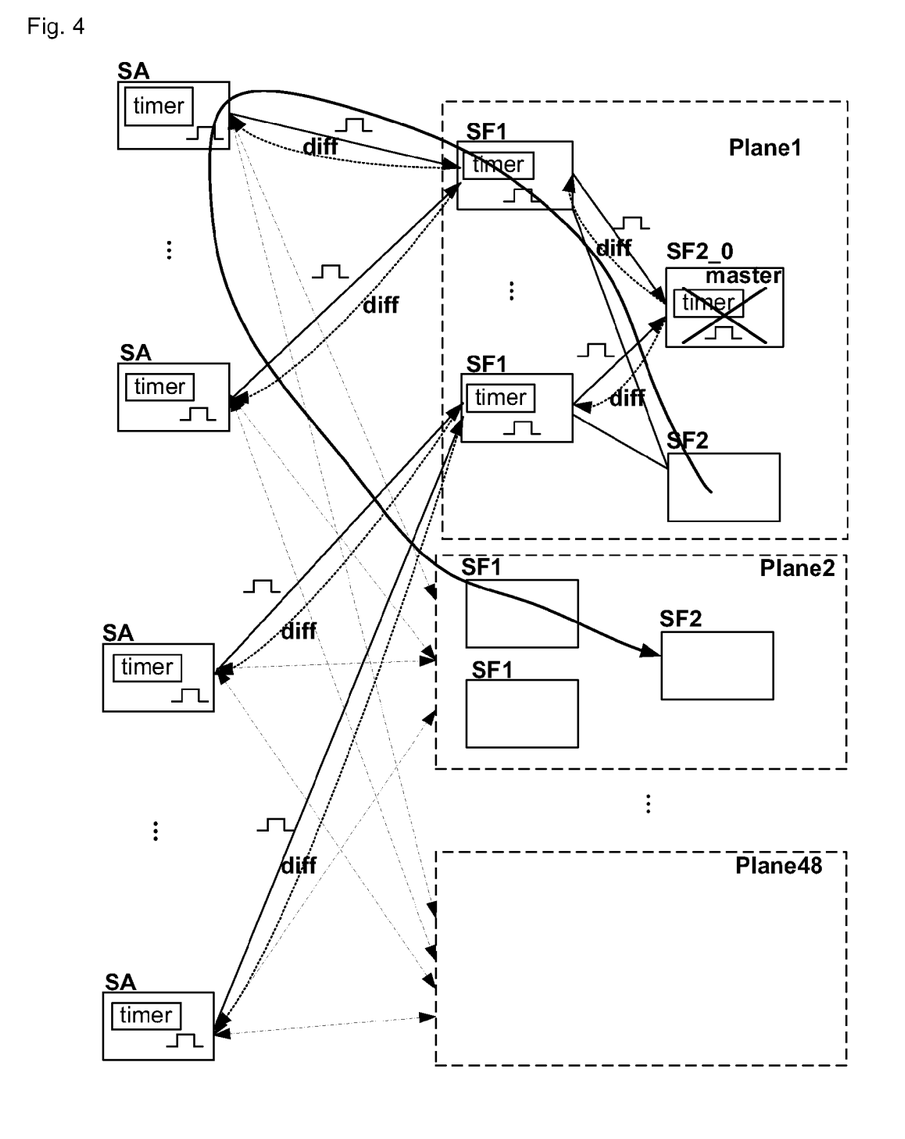
FIG. 4 is a schematic diagram illustrating the selection of a new reference caused when a reference clock chip malfunctions.

If the reference chip malfunctions and losses connection with all other chips, then an SF1 chip or SA chip connected with the SF2 chip reselects a new reference clock from the remaining SF2 chips and is aligned with the new reference clock, and then diffuses the new reference to the whole system, as shown in FIG. 4.

Figure 5:
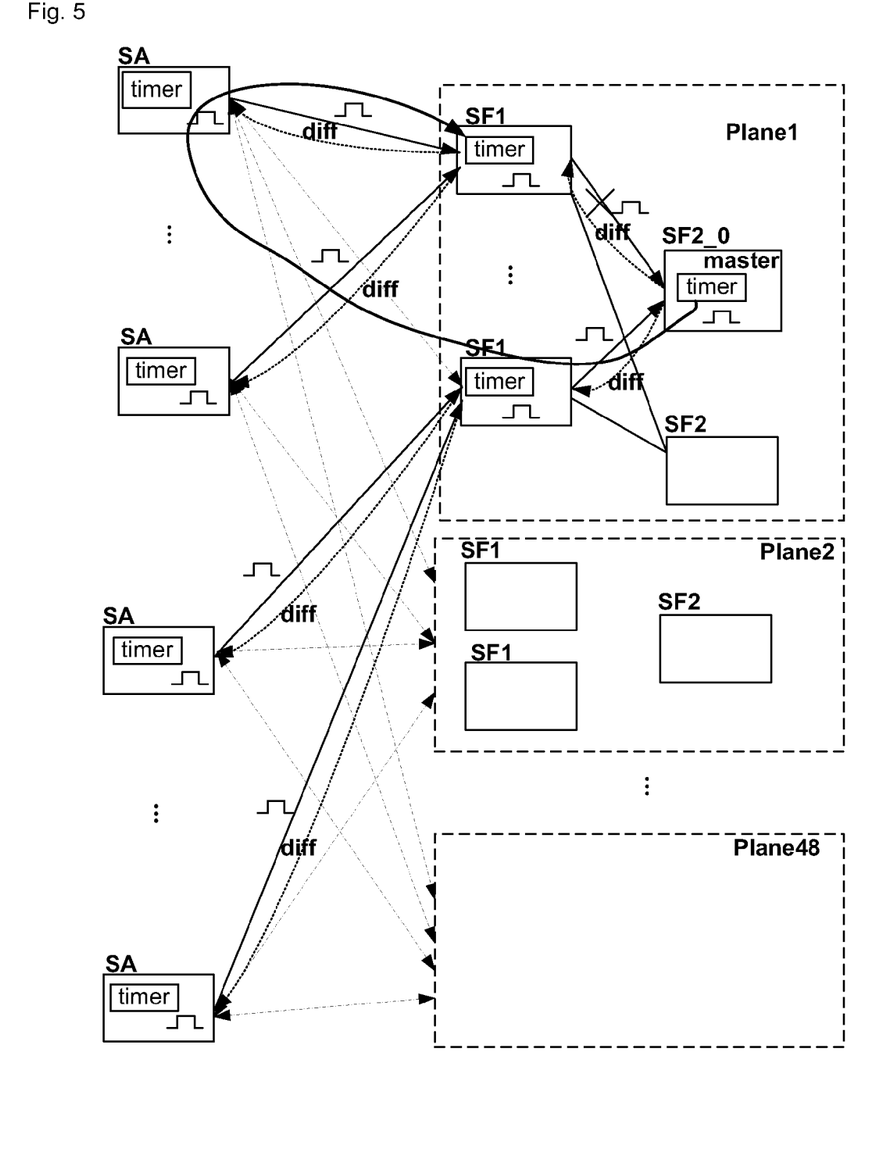
FIG. 5 is a schematic diagram illustrating the change of a reference selection path caused by the fault of a high-speed link serdes of an SF1 chip.

If only the high-speed link serdes of a certain SF1 chip for connecting a reference chip malfunctions, then the P_SF2_ID in the calibration cell sent by the SF1 chip is changed to a connected SF2 just smaller in P_SF2_ID than the SF1 chip and connected with the SF1 chip, the subordinate SA chip of the SF1 chip compares the received calibration cells to reselect another SF1 chip having the minimum P_SF2_ID and connected with the reference chip to calibrate the timer of the SA chip, and the SF1 chip the connection of which with the reference chip is faulted selects a subordinate SA chip through comparison to calibrate the timer of the SF1 chip, the change path is shown in FIG. 5.

Figure 6:
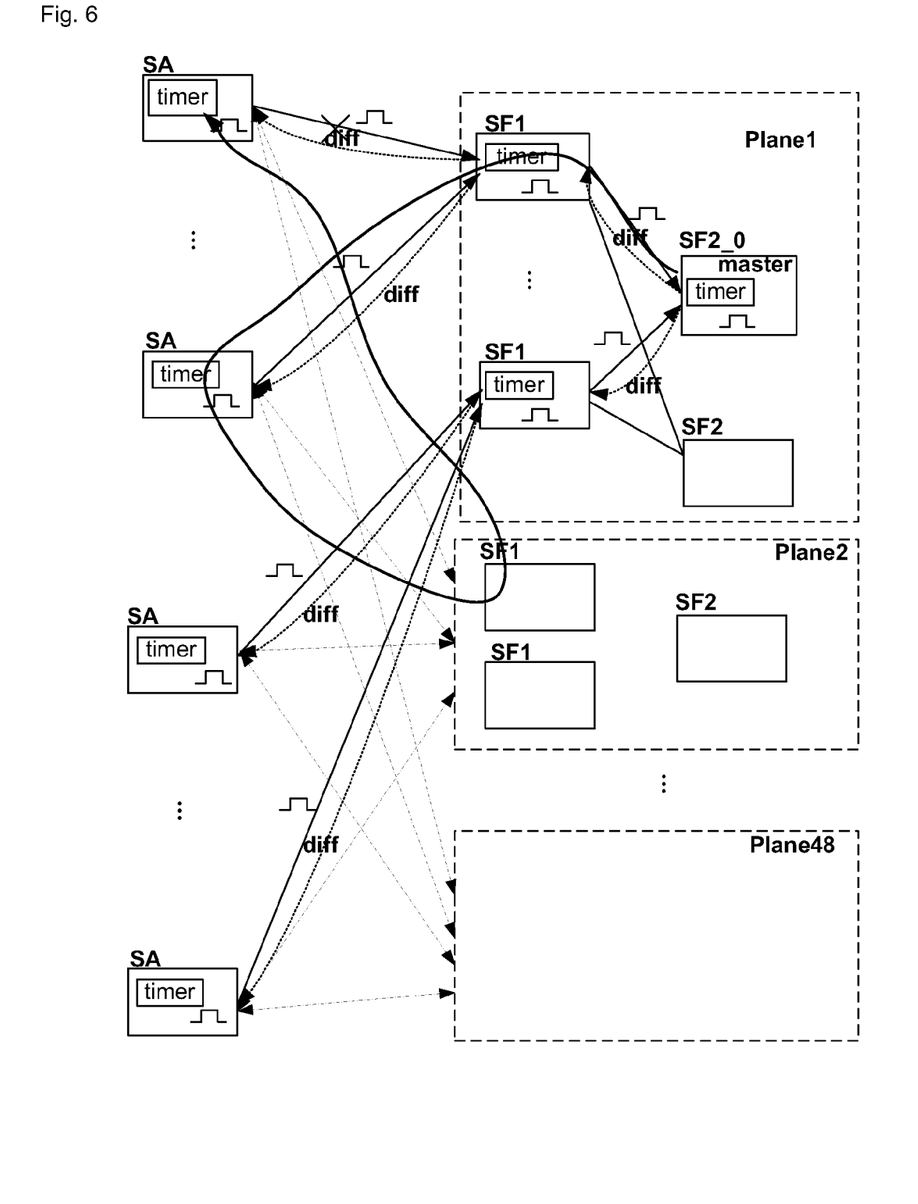
FIG. 6 is a schematic diagram illustrating the proceeding of timing synchronization through another plane.

If the connection of an SA chip with each high-speed link serdes in the plane 1 is faulted, then the SA chip is still capable of calibrating its own timer by using a synchronized SF1 chip in a plane 2, as shown in FIG. 6.

Figure 7:
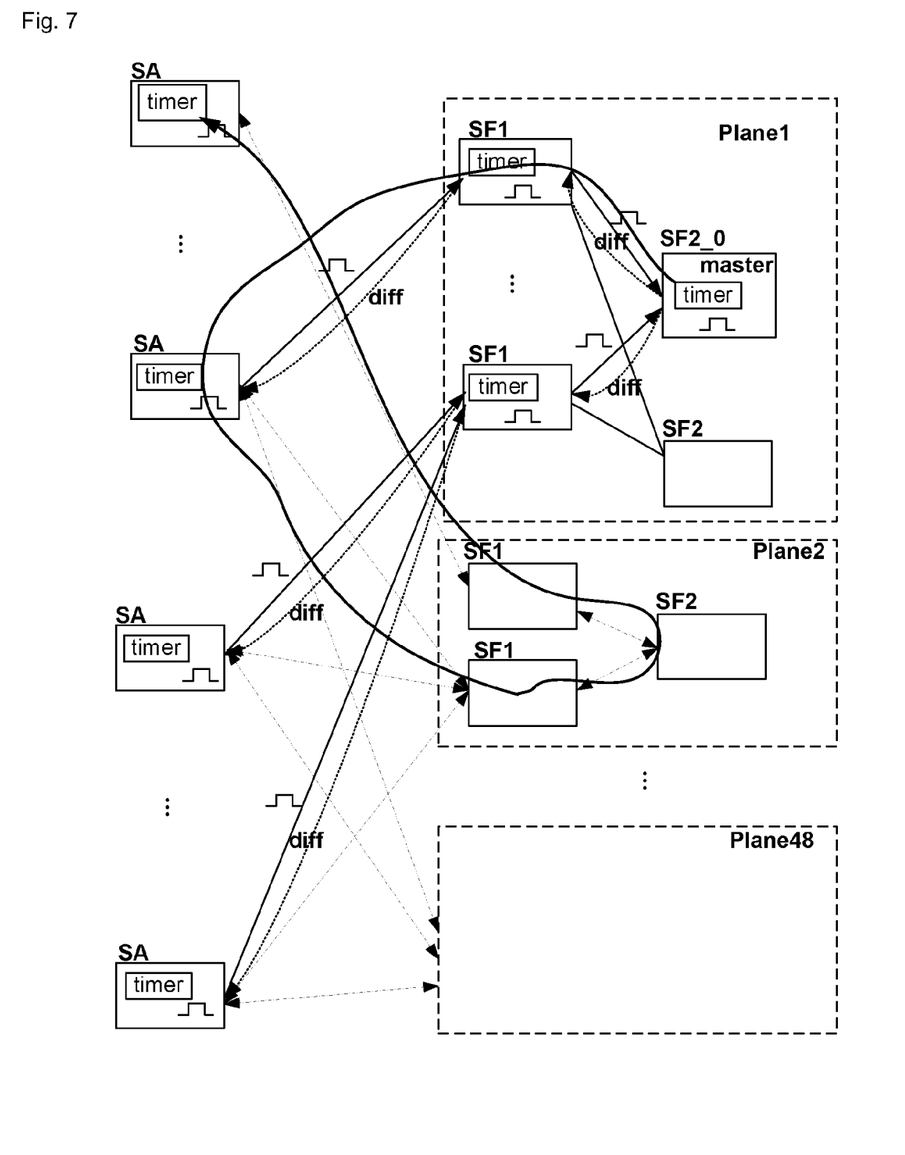
FIG. 7 is a schematic diagram illustrating the transfer of synchronization information through an SF2 chip.

Further, if an SA chip can only be connected with one SF1 chip in the plane 2 and the SF1 chip also can only be connected with the SA chip and can only be connected with an SF2 chip upward, then the synchronization information of SF2_0 can still be transferred to the SA chip to keep the SA chip synchronized with the SF2_0, as shown in FIG. 7. By analogy, the synchronization can also be implemented in the cases of many other faults, for example, in a system, if a normally working SA chip is connected with an SF1 chip through only one path, each SF1 chip can only be connected with one SA chip and one SF2 chip, and each SF2 chip can only be connected with two SF1 chips (a data cell exchange is unachievable if each SF2 chip is only connected with one SF1 chip, not to mention global synchronization), then SA chips can be synchronized as long as the SA chips have a logic path connected with the reference chip.

Since the top-to-down synchronization process (SF2→SA) is implemented through the comparison of P_SF2_IDs (representing a topology structure) while the down-to-top synchronization process (SA→SF2) is implemented through the comparison of C_SF2_IDs (representing a reference relationship), the two processes are independent from each other, which does not result in the mutual locked calibration of two chips, thereby avoiding an endless loop and implementing the reliable synchronization of the whole system.

For single-level switching architecture and Mesh architecture, the synchronization process is simpler and can be deduced from the process described above.

Figure 8:
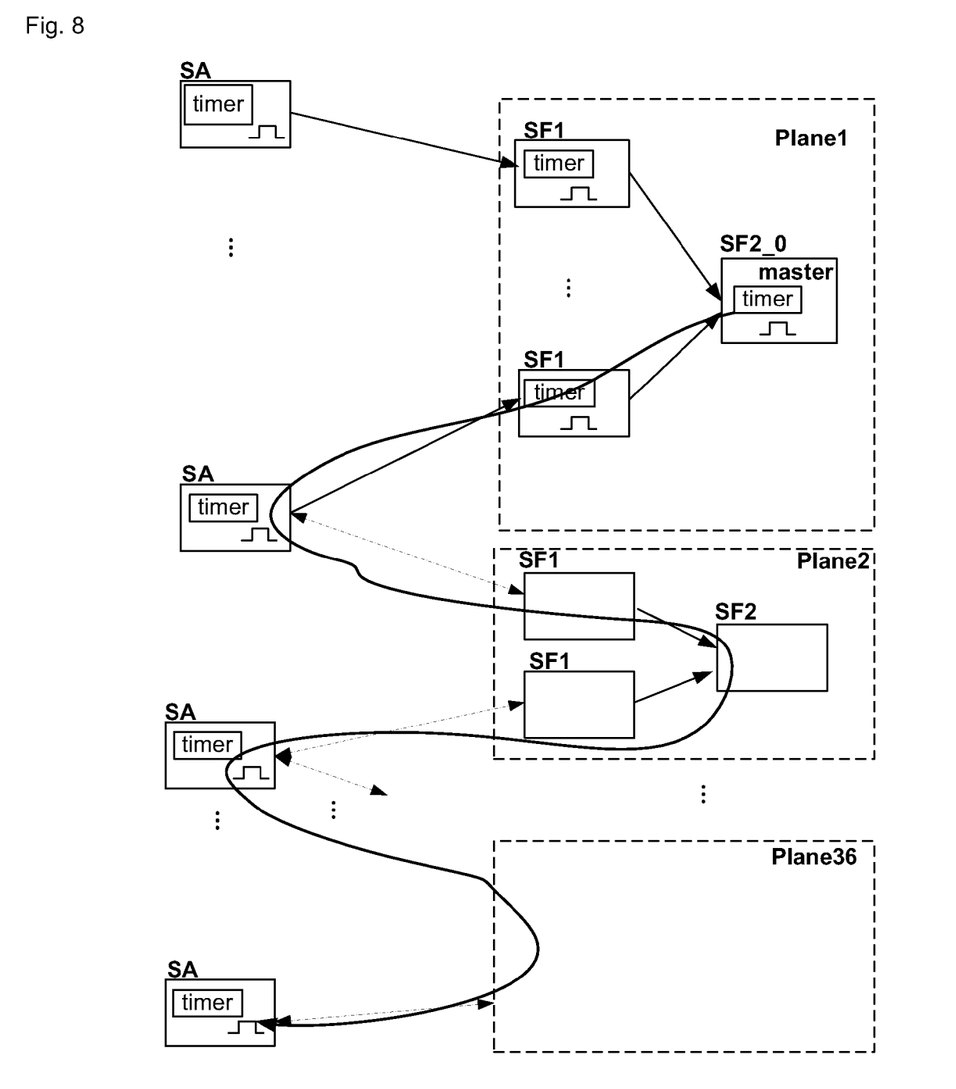
FIG. 8 is a schematic diagram illustrating the synchronization implemented through a plurality of chips.

It can be seen from the process above that the SA chip furthest from the reference chip on a logic path may be synchronized through a plurality of levels of SF2, SF1 and SA chips, in this case, it is considered whether a timing error is increased with the increase of the number of the levels of intermediate paths, as in the case shown in FIG. 8.

Figure 9:
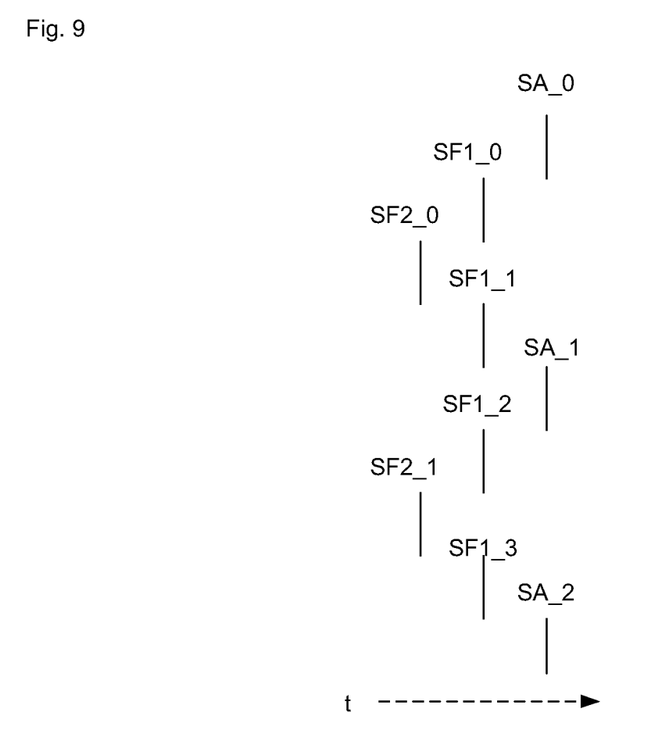
FIG. 9 is a schematic diagram illustrating the timing deviation of each chip in multi-level synchronization.

In FIG. 8, almost all SA chips are unidirectionally connected, and the SA furthest from a reference chip is finally synchronized through hundreds of chips. However, since a higher-level chip calibrates its own timer by using a received zero-point pulse or zero-point pulse cell when the higher-level chip is calibrated by a lower-level chip and a lower-level chip calibrates its own timer by using the difference value in a received calibration cell when the lower-level chip is calibrated by a higher-level chip, the two reverse processes enable an error to be compensated. The timing of a sender of the zero-point pulse or zero-point pulse cell is always reached earlier than that of a receiver, whereas the sender of the zero-point pulse or zero-point pulse cell is always a lower-level chip. The zero-point difference of each chip in the system shown in FIG. 8 is shown in FIG. 9. It can be seen that the timing starting point of each SA chip is substantially the same in fact and the error is not increased with the increase of intermediate levels.

Accordingly, the disclosure also discloses a global synchronization system based on a packet switching system, which includes a reference chip and at least one another chip which calibrates its own timer by taking the reference chip as a reference.

The reference chip is elected by all chips or designated by a CPU.

Each chip is further configured to send a zero-point pulse or zero-point pulse cell to each high-speed link serdes connected with the chip, and feed back a calibration cell in response to a zero-point pulse cell or zero-point pulse cell received through each high-speed link serdes connected with the chip.

Each chip is configured to: calibrate its own timer by using the received zero-point pulse or zero-point pulse cell when the chip is calibrated by a lower-level chip, or calibrate its own timer by using a difference value in the received calibration cell when the chip is calibrated by a higher-level chip or a same level chip, wherein a Switch Fabric level 1 (SF1) chip has a level lower than that of a Switch Fabric level 2 (SF2) chip and higher than that of a Switch Access (SA) chip.

When the reference chip is an SF2 chip or SA chip, each SF2 chip is configured to:

set an initial value of the reference chip of the SF2 chip as a maximum invalid value;

after all effective links connected with the SF2 chip receive a calibration cell, compare C_SF2_IDs in all calibration cells received, wherein each of the C_SF2_IDs represents an SF2 chip from which a timing reference of the SF2 chip comes;

when all the C_SF2_IDs are greater than its own Identify (ID) of the SF2 chip, determine that the SF2 chip is a reference clock, and carry out no calibration on its own timer;

when its own ID of the SF2 chip is not minimum, select a link to which a minimum C_SF2_ID of the received C_SF2_IDs corresponds, to calibrate its own timer; and when its own ID of the SF2 chip is not minimum and a minimum C_SF2_ID is received through a plurality of links in the all effective links, select, from the plurality of links, a link an opposite terminal chip of which has a minimum SRC_ID to calibrate its own timer.

The SF2 chip is further configured to send a calibration cell to each high-speed link serdes, wherein a P_SF2_ID in the calibration cell is filled with the ID of the SF2 chip and the calibration cell includes a measured difference value Diff_t.

When the reference chip is an SF2 chip or SA chip, each SF1 chip is configured to:

set an initial value of the reference chip of the SF1 chip as a maximum invalid value;

after all effective links connected with the SF1 chip receive a calibration cell, compare the received calibration cells;

when a P_SF2_ID or C_SF2_ID of the calibration cell on a link in the all effective links is minimum, select the link to calibrate its own timer, wherein the P_SF2_ID represents an SF2 chip which is directly connected with the SF1 chip through a physical link and has a minimum ID, and the C_SF2_ID represents an SF2 chip from which a timing reference of the SF1 chip comes;

when a minimum P_SF2_ID or C_SF2_ID is received through a plurality of links in the all effective links and the plurality of links have different types of opposite terminal chips, select, from the plurality of links, a link an opposite terminal chip of which is an SF2 chip to calibrate its own timer; and when a minimum P_SF2_ID or C_SF2_ID is received through a plurality of links in the all effective links and the plurality of links no link in the plurality of links has an opposite terminal SF2 chip, select a link an opposite terminal chip of which has a minimum SRC_ID to calibrate its own timer.

The SF1 chip is further configured to: after the SF1 chip determines its own reference chip, fill the P_SF2_ID or C_SF2_ID the reference chip into a C_SF2_ID field, send the C_SF2_ID field to all SF2 chips connected with the SF1 chip, fill the SF2 chip physically connected with the SF1 chip and having the minimum ID into a P_SF2_ID field, and send the P_SF2_ID field to all SA chips connected with the SF1 chip; and when the SF1 chip is disconnected with all SF2 chips connected with the SF1 chip, fill the maximum invalid value into the P_SF2_ID field.

When the reference chip is an SF2 chip or SA chip, each SA chip is configured to:

set an initial value of the reference chip of the SA chip as a maximum invalid value;

after all effective links connected with the SA chip receive a calibration cell, compare the received calibration cells;

when an opposite terminal chip of the SA chip is an SF1 chip or SF2 chip, compare P_SF2_IDs in the received calibration cells, select a link corresponding to a minimum P_SF2_ID to calibrate its own timer, and record the minimum P_SF2_ID as a reference chip of the SA chip after the calibration;

when an opposite terminal chip of the SA chip is an SF1 chip or SF2 chip and a minimum P_SF2_ID is received through a plurality of links in the all effective links, select, from the plurality of links, a link an opposite terminal chip of which has a minimum SRC_ID to calibrate its own timer, and record the minimum P_SF2_ID as the reference chip of the SA chip after the calibration; and when an opposite terminal chip of the SA chip is an SA chip, compare all received SRC_IDs, use a minimum SRC_ID as a reference to calibrate its own timer, and record the minimum SRC_ID as its own reference chip after the calibration; and when the received minimum SRC_ID is greater than an ID of the SA chip, determine that the SA chip is a reference clock, and carry out no calibration on its own timer.

The SA chip is further configured to: after the SA chip determines its own reference chip, fill the P_SF2_ID or SRC_ID of the reference chip into a C_SF2_ID field, measure a difference value Diff_Time, and send a calibration cell including the difference value Diff_Time to each high-speed link serdes connected with the SA chip.

The above are only the preferred embodiments of the disclosure, and are not intended to limit the scope of protection of the claims of the disclosure.

The invention claimed is:

1. A global synchronization method based on a packet switching system, the packet switching system comprising a plurality of chips, the method comprising:
    selecting one of the chips as a reference chip; and
    calibrating, by each of the other chips, its own timer by taking the reference chip as a reference,
    wherein the method further comprises:
    sending, by each chip, a zero-point pulse or zero-point pulse cell to each high-speed link connected with the chip, and feeding back a calibration cell in response to a zero-point pulse or zero-point pulse cell received through each high-speed link.

2. The method according to claim 1, wherein the selected reference chip is a reference chip elected by all the chips, or a reference chip designated by a Central Processing Unit (CPU).

3. The method according to claim DU, wherein the step of calibrating, by each chip, its own timer by taking the reference chip as a reference comprises:
    calibrating, by each chip, its own timer by using the received zero-point pulse or zero-point pulse cell when the chip is calibrated by a lower-level chip, or calibrating its own timer by using a difference value in the received calibration cell when the chip is calibrated by a higher-level chip or a same level chip, wherein a Switch Fabric level 1 (SF1) chip has a level lower than that of a Switch Fabric level 2 (SF2) chip and higher than that of a Switch Access (SA) chip.

4. The method according to claim 1, wherein when the reference chip is an SF2 chip, the step of calibrating, by each SF2 chip, its own timer by taking the reference chip as a reference comprises:
    setting, by the SF2 chip, an initial value of the reference chip of the SF2 chip as a maximum invalid value;

after all effective links connected with the SF2 chip receive a calibration cell, comparing, by the SF2 chip, C_SF2_IDs in all calibration cells received, wherein each of the C_SF2_IDs represents an SF2 chip from which a timing reference of the SF2 chip comes;

when all the C_SF2_IDs are greater than its own Identify (ID) of the SF2 chip, determining, by the SF2 chip, that the SF2 chip is a reference clock, and carrying out no calibration on its own timer;

when its own ID of the SF2 chip is not minimum, selecting, by the SF2 chip, a link to which a minimum C_SF2_ID of the received C_SF2_IDs corresponds, to calibrate its own timer; and when its own ID of the SF2 chip is not minimum and a minimum C_SF2_ID is received through a plurality of links in the all effective links, selecting, by the SF2 chip, from the plurality of links, a link an opposite terminal chip of which has a minimum SRC_ID to calibrate its own timer.

5. The method according to claim 4, further comprising:
sending, by the SF2 chip, a calibration cell to each high-speed link, wherein a P_SF2_ID in the calibration cell is filled with the ID of the SF2 chip and the calibration cell includes a measured difference value Diff_t.

6. The method according to claim 1, wherein when the reference chip is an SF2 chip, the step of calibrating, by each SF1 chip, its own timer by taking the reference chip as a reference comprises:
setting, by the SF1 chip, an initial value of the reference chip of the SF1 chip as a maximum invalid value;
after all effective links connected with the SF1 chip receive a calibration cell, comparing, by the SF1 chip, the received calibration cells;
when a P_SF2_ID or C_SF2_ID of the calibration cell on a link in the all effective links is minimum, selecting, by the SF1 chip, the link to calibrate its own timer, wherein the P_SF2_ID represents an SF2 chip which is directly connected with the SF1 chip through a physical link and has a minimum ID, and the C_SF2_ID represents an SF2 chip from which a timing reference of the SF1 chip comes; and
when a minimum P_SF2_ID or C_SF2_ID is received through a plurality of links in the all effective links and the plurality of links have different types of opposite terminal chips, selecting, by the SF1 chip, from the plurality of links, a link an opposite terminal chip of which is an SF2 chip to calibrate its own timer.

7. The method according to claim 6, further comprising:
after the SF1 chip determines its own reference chip, filling, by the SF1 chip, the P_SF2_ID or C_SF2_ID of the reference chip into a C_SF2_ID field, sending the C_SF2_ID field to all SF2 chips connected with the SF1 chip, filling the SF2 chip physically connected with the SF1 chip and having the minimum ID into a P_SF2_ID field, and sending the P_SF2_ID field to all SA chips connected with the SF1 chip; and when the SF1 chip is disconnected with all SF2 chips connected with the SF1 chip, filling the maximum invalid value into the P_SF2_ID field.

8. The method according to claim 1, wherein when the reference chip is an SF2 chip or SA chip, the step of calibrating, by each SA chip, its own timer by taking the reference chip as a reference comprises:
setting, by the SA chip, an initial value of the reference chip of the SA chip as a maximum invalid value;
after all effective links connected with the SA chip receive a calibration cell, comparing, by the SA chip, the received calibration cells;
when an opposite terminal chip of the SA chip is an SF1 chip or SF2 chip, comparing, by the SA chip, P_SF2_IDs in the received calibration cells, selecting a link corresponding to a minimum P_SF2_ID to calibrate its own timer, and recording the minimum P_SF2_ID as a reference chip of the SA chip after the calibration;
when an opposite terminal chip of the SA chip is an SF1 chip or SF2 chip and a minimum P_SF2_ID is received through a plurality of links in the all effective links, selecting, by the SA chip, from the plurality of links, a link an opposite terminal chip of which has a minimum SRC_ID to calibrate its own timer, and recording the minimum P_SF2_ID as the reference chip of the SA chip after the calibration; and
when an opposite terminal chip of the SA chip is an SA chip, comparing, by the SA chip, all received SRC_IDs, using a minimum SRC_ID as a reference to calibrate its own timer, and recording the minimum SRC_ID as its own reference chip after the calibration; and when the received minimum SRC_ID is greater than an ID of the SA chip, determining, by the SA chip, that the SA chip is a reference clock, and carrying out no calibration on its own timer.

9. The method according to claim 8, further comprising:
after the SA chip determines its own reference chip, filling, by the SA chip, the P_SF2_ID or SRC_ID of the reference chip into a C_SF2_ID field, measuring a difference value Diff_Time, and sending a calibration cell including the difference value Diff_Time to each high-speed link connected with the SA chip.

10. A global synchronization system based on a packet switching system, comprising a plurality of chips which contain a reference chip and at least one another chip which calibrates its own timer by taking the reference chip as a reference,
wherein each chip is configured to: calibrate its own timer by using the received zero-point pulse or zero-point pulse cell when the chip is calibrated by a lower-level chip, or calibrate its own timer by using a difference value in the received calibration cell when the chip is calibrated by a higher-level chip or a same level chip, wherein a Switch Fabric level 1 (SF1) chip has a level lower than that of a Switch Fabric level 2 (SF2) chip and higher than that of a Switch Access (SA) chip.

11. The system according to claim 10, wherein the reference chip is elected by all the chips or designated by a Central Processing Unit (CPU).

12. The system according to claim 10, wherein each chip is configured to: calibrate its own timer by using the received zero-point pulse or zero-point pulse cell when the chip is calibrated by a lower-level chip, or calibrate its own timer by using a difference value in the received calibration cell when the chip is calibrated by a higher-level chip or a same level chip, wherein a Switch Fabric level 1 (SF1) chip has a level lower than that of a Switch Fabric level 2 (SF2) chip and higher than that of a Switch Access (SA) chip.

13. The system according to claim 10, wherein when the reference chip is an SF2 chip, each SF2 chip is configured to:
set an initial value of the reference chip of the SF2 chip as a maximum invalid value;
after all effective links connected with the SF1 chip receive a calibration cell, compare C_SF2_IDs in all calibration cells received, wherein each of the C_SF2_IDs represents an SF2 chip from which a timing reference of the SF2 chip comes;

when all the C_SF2_IDs are greater than its own Identify (ID) of the SF2 chip, determine that the SF2 chip is a reference clock, and carry out no calibration on its own timer;

when its own ID of the SF2 chip is not minimum, select a link to which a minimum C_SF2_ID of the received C_SF2_IDs corresponds, to calibrate its own timer; and when its own ID of the SF2 chip is not minimum and a minimum C_SF2_ID is received through a plurality of links in the all effective links, select, from the plurality of links, a link an opposite terminal chip of which has a minimum SRC_ID to calibrate its own timer.

14. The system according to claim 13, wherein the SF2 chip is further configured to send a calibration cell to each high-speed link, wherein a P_SF2_ID in the calibration cell is filled with the ID of the SF2 chip and the calibration cell includes a measured difference value Diff_t.

15. The system according to claim 10, wherein when the reference chip is an SF2 chip, each SF1 chip is configured to:
   set an initial value of the reference chip of the SF1 chip as a maximum invalid value;
   after all effective links connected with the SF2 chip receive a calibration cell, compare the received calibration cells;
   when a P_SF2_ID or C_SF2_ID of the calibration cell on a link in the all effective links is minimum, select the link to calibrate its own timer, wherein the P_SF2_ID represents an SF2 chip which is directly connected with the SF1 chip through a physical link and has a minimum ID, and the C_SF2_ID represents an SF2 chip from which a timing reference of the SF1 chip comes; and
   when a minimum P_SF2_ID or C_SF2_ID is received through a plurality of links in the all effective links and the plurality of links have different types of opposite terminal chips, select, from the plurality of links, a link an opposite terminal chip of which is an SF2 chip to calibrate its own timer.

16. The system according to claim 15, wherein the SF1 chip is further configured to: after the SF1 chip determines its own reference chip, fill the P_SF2_ID or C_SF2_ID of the reference chip into a C_SF2_ID field, send the C_SF2_ID field to all SF2 chips connected with the SF1 chip, fill the SF2 chip physically connected with the SF1 chip and having the minimum ID into a P_SF2_ID field, and send the P_SF2_ID field to all SA chips connected with the SF1 chip; and when the SF1 chip is disconnected with all SF2 chips connected with the SF1 chip, fill the maximum invalid value into the P_SF2_ID field.

17. The system according to claim 10, wherein when the reference chip is an SF2 chip or SA chip, each SA chip is configured to:
   set an initial value of the reference chip of the SA chip as a maximum invalid value;
   after all effective links connected with the SA chip receive a calibration cell, compare the received calibration cells;
   when an opposite terminal chip of the SA chip is an SF1 chip or SF2 chip, compare P_SF2_IDs in the received calibration cells, select a link corresponding to a minimum P_SF2_ID to calibrate its own timer, and record the minimum P_SF2_ID as a reference chip of the SA chip after the calibration;
   when an opposite terminal chip of the SA chip is an SF1 chip or SF2 chip and a minimum P_SF2_ID is received through a plurality of links in the all effective links, select, from the plurality of links, a link an opposite terminal chip of which has a minimum SRC_ID to calibrate its own timer, and record the minimum P_SF2_ID as the reference chip of the SA chip after the calibration; and
   when an opposite terminal chip of the SA chip is an SA chip, compare all received SRC_IDs, use a minimum SRC_ID as a reference to calibrate its own timer, and record the minimum SRC_ID as its own reference chip after the calibration; and when the received minimum SRC_ID is greater than an ID of the SA chip, determine that the SA chip is a reference clock, and carry out no calibration on its own timer.

18. The system according to claim 17, wherein the SA chip is further configured to: after the SA chip determines its own reference chip, fill the P_SF2_ID or SRC_ID of the reference chip into a C_SF2_ID field, measure a difference value Diff_Time, and send a calibration cell including the difference value Diff_Time to each high-speed link connected with the SA chip.

* * * * *